(12) United States Patent
Ryu et al.

(10) Patent No.: US 10,819,911 B2
(45) Date of Patent: Oct. 27, 2020

(54) ELECTRONIC DEVICE FOR ZOOMING A PREVIEW IMAGE

(71) Applicant: LG ELECTRONICS INC., Seoul (KR)

(72) Inventors: Jaekyung Ryu, Seoul (KR); Jinbum Kim, Seoul (KR); Gunshik Shin, Seoul (KR); Taewoo Lee, Seoul (KR); Sungbum Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/029,524

(22) Filed: Jul. 6, 2018

(65) Prior Publication Data

US 2019/0045135 A1 Feb. 7, 2019

(30) Foreign Application Priority Data

Aug. 3, 2017 (KR) .................. 10-2017-0098337

(51) Int. Cl.
*H04N 5/232* (2006.01)
*G06T 3/40* (2006.01)
*G06T 7/70* (2017.01)
*G06F 3/0488* (2013.01)

(52) U.S. Cl.
CPC ......... *H04N 5/232935* (2018.08); *G06T 3/40* (2013.01); *G06T 7/70* (2017.01); *H04N 5/23216* (2013.01); *H04N 5/23296* (2013.01); *H04N 5/232933* (2018.08); *H04N 5/232945* (2018.08); *G06F 3/0488* (2013.01); *G06F 2203/04806* (2013.01)

(58) Field of Classification Search
CPC ......... H04N 5/23216; H04N 5/232933; H04N 5/232935; H04N 5/232945; H04N 5/23296; G06T 3/40; G06T 3/0484; G06T 7/70
See application file for complete search history.

(56) References Cited

U.S. PATENT DOCUMENTS 7,806,604 B2 * 10/2010 Bazakos ............ G06K 9/00255
                                                                       348/153
9,628,717 B2 * 4/2017 Tsubusaki .......... H04N 5/23216
10,147,191 B1 * 12/2018 Ribeiro .............. H04N 5/23238
(Continued)

FOREIGN PATENT DOCUMENTS

| KR | 1020120060677 | 6/2012 |
| KR | 1020140000518 | 1/2014 |

(Continued)

OTHER PUBLICATIONS

Korean Intellectual Property Office Application No. 10-2017-0098337, Office Action dated Sep. 5, 2018, 6 pages.

*Primary Examiner* — Ngoc Yen T Vu
(74) *Attorney, Agent, or Firm* — Lee Hong Degerman Kang & Waimey

(57) ABSTRACT

The present invention is related to an electronic device and a method for controlling the electronic device. According to the present invention, if a Point Of Interest (POI) to be enlarged is selected from a camera image, resizing is performed with a predetermined resizing speed while the POI is being zoom-processed to be displayed at the center of a screen, and thereby an arbitrary area may be enlarged or decreased, providing an effect of smoothly enlarging or decreasing the POI.

15 Claims, 24 Drawing Sheets

(56) References Cited

U.S. PATENT DOCUMENTS

| | | | |
|---|---|---|---|
| 10,264,171 B2* | 4/2019 | Ikeda | G02B 7/08 |
| 2006/0062435 A1* | 3/2006 | Yonaha | G06T 11/60 |
| | | | 382/118 |
| 2010/0110266 A1* | 5/2010 | Lee | H04N 5/23293 |
| | | | 348/333.02 |
| 2013/0104076 A1 | 4/2013 | Cristescu et al. | |
| 2013/0155308 A1* | 6/2013 | Wu | H04N 5/23293 |
| | | | 348/333.05 |
| 2016/0054903 A1* | 2/2016 | Jeong | H04N 5/2621 |
| | | | 345/661 |

FOREIGN PATENT DOCUMENTS

| | | |
|---|---|---|
| KR | 1020140062801 | 5/2014 |
| KR | 1020160024143 | 3/2016 |

* cited by examiner

[d₁ = d₂, d₃ = d₄ = d₅]

ELECTRONIC DEVICE FOR ZOOMING A PREVIEW IMAGE

CROSS-REFERENCE TO RELATED APPLICATIONS

Pursuant to 35 U.S.C § 119(a), this application claims the benefit of earlier filing date and right of priority to Korean Patent Application No. 10-2017-0098337, filed on Aug. 3, 2017, the contents of which are hereby incorporated by reference in their entirety.

BACKGROUND OF THE INVENTION

Field of the Invention

The present invention relates to an electronic device and a method for controlling the electronic device. More specifically, the present invention relates to an electronic device capable of performing a zoom operation more efficiently during a process for capturing a camera image and a method for controlling the electronic device.

Related Art

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, as the performance of a camera used for a mobile terminal is improved, various camera capture functions may be provided. While taking an image, the user may apply an input (pinch zoom gesture) to enlarge or decrease the image. In this case, image resizing due to the user's input is affected by unsteady hand motion. In particular, when an image is enlarged or decreased due to a pinch zoom (out) input during video shooting, the unsteady hand motion of the user may be directly reflected in the captured video.

Accordingly, when the speed of pinch zoom (out) input of a user is not steadily maintained, zoom-processing of images is actually not performed uniformly, either.

Moreover, even if a user receives a pinch zoom (out) input with respect to a desired zoom point while shooting a video, an image is zoom-processed actually with respect to the central point of a screen independently of the zoom point desired by the user.

SUMMARY OF THE INVENTION

Accordingly, an object of the present invention is to address the above-noted and other problems.

An object of the present invention is to provide a mobile terminal providing a user interface by which a user can control the mobile terminal easily and efficiently and a method of controlling the same.

Also, an object of the present invention is to provide an electronic device capable of obtaining an image with higher quality through a mobile terminal by zoom-processing a Point Of Interest (POI) in a stepwise manner without the user's manipulation and a method for controlling the electronic device.

Also, an object of the present invention is to provide an electronic device capable of obtaining an image zoom-processed through a more convenient method, the image containing an object designated by the user among objects provided by preview images, and a method for controlling the electronic device.

An electronic device according to one aspect of the present invention includes a camera; a display displaying a preview image obtained by executing the camera; and a controller, when a POI is selected from the preview image, controlling the display to display a zoom image obtained by resizing the POI in a stepwise manner according to a predetermined resizing speed with respect to a resizing area determined on the basis of the POI, wherein the resizing speed is changeable according to a predetermined input.

Here, the area which is resized and zoom-processed may be zoom-processed with respect to an area designated through a predetermined input, not with respect to the central area of the preview.

The POI may be selected on the basis of a touch point input to the display, and the controller may display a guide indicating the selected POI on the display.

The POI may include a subject selected on the basis of the touch point.

The selected subject may include a moving object, and the controller may change the position of the POI by tracking the motion of the moving object through the camera.

The controller may change the resizing speed according to the speed at which the moving object moves.

When the controller detects motion of the moving object, the controller may recalculate the resizing area on the basis of the position of the moving object and change the resizing speed according to the recalculated resizing area.

The mobile terminal is further equipped with a wide angle camera having a field of view larger than that of the camera, and when the moving object gets out of the field of view of the camera, the controller may activate the wide angle camera so that the moving object may stay within the POI.

The size of the POI may be changeable.

The resizing area may be an area excluding the POI from the whole area of the preview image.

The resizing speed may be determined according to the size of the resizing area. Therefore, the larger the size of a POI, the faster the resizing speed; and the smaller the size of a POI, the slower the resizing speed.

The resizing may be the motion of enlarging or decreasing a resizing area with the resizing speed from the POI.

The camera may include a first camera obtaining a wide angle area including a main subject and a second camera obtaining a telephoto image zooming the main subject.

When the POI enters a field of view of the second camera while the POI is resized through the first camera in a stepwise manner, the controller may display, on the display, a zoom image obtained by resizing the POI in a stepwise manner by using the second camera.

When a predetermined input is received while the POI is resized in a stepwise manner, the controller may recover the original preview image before final zoom motion for the POI is completed and display the recovered preview image on the display.

While an image obtained through the camera is being recorded, the controller may display, on the display, a zoom image obtained by resizing the POI in a stepwise manner.

A method for controlling an electronic device according to another aspect of the present invention may include displaying a preview image obtained by executing a camera on a display; when a POI is selected from the preview image, determining a resizing area on the basis of the POI; and displaying, on the display, a zoom image obtained by resizing the POI in a stepwise manner according to a predetermined resizing speed with respect to the resizing area, wherein the resizing speed is changeable according to a predetermined input.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

With the mobile terminal and the method of controlling the same according to the present invention, the following effects are obtained.

According to the present invention, an image with higher quality may be obtained through a mobile terminal by zoom-processing of a POI in a stepwise manner without the user's manipulation.

Also, according to the present invention, an image zoom-processed through a more convenient method may be obtained, the image containing an object designated by the user among objects provided by preview images.

Also, according to the present invention, zoom motion with respect to a POI in a screen provided through a camera may be processed more efficiently by selectively activating a plurality of cameras having various functions installed in an electronic device.

Further scope of applicability of the present invention will become apparent from the detailed description given hereinafter. However, since various modifications and changes may be clearly understood by those skilled in the art within the technical spirit and scope of the present invention, detailed descriptions and specific embodiments such as preferred embodiments of the present invention should be understood as being provided simply as examples.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
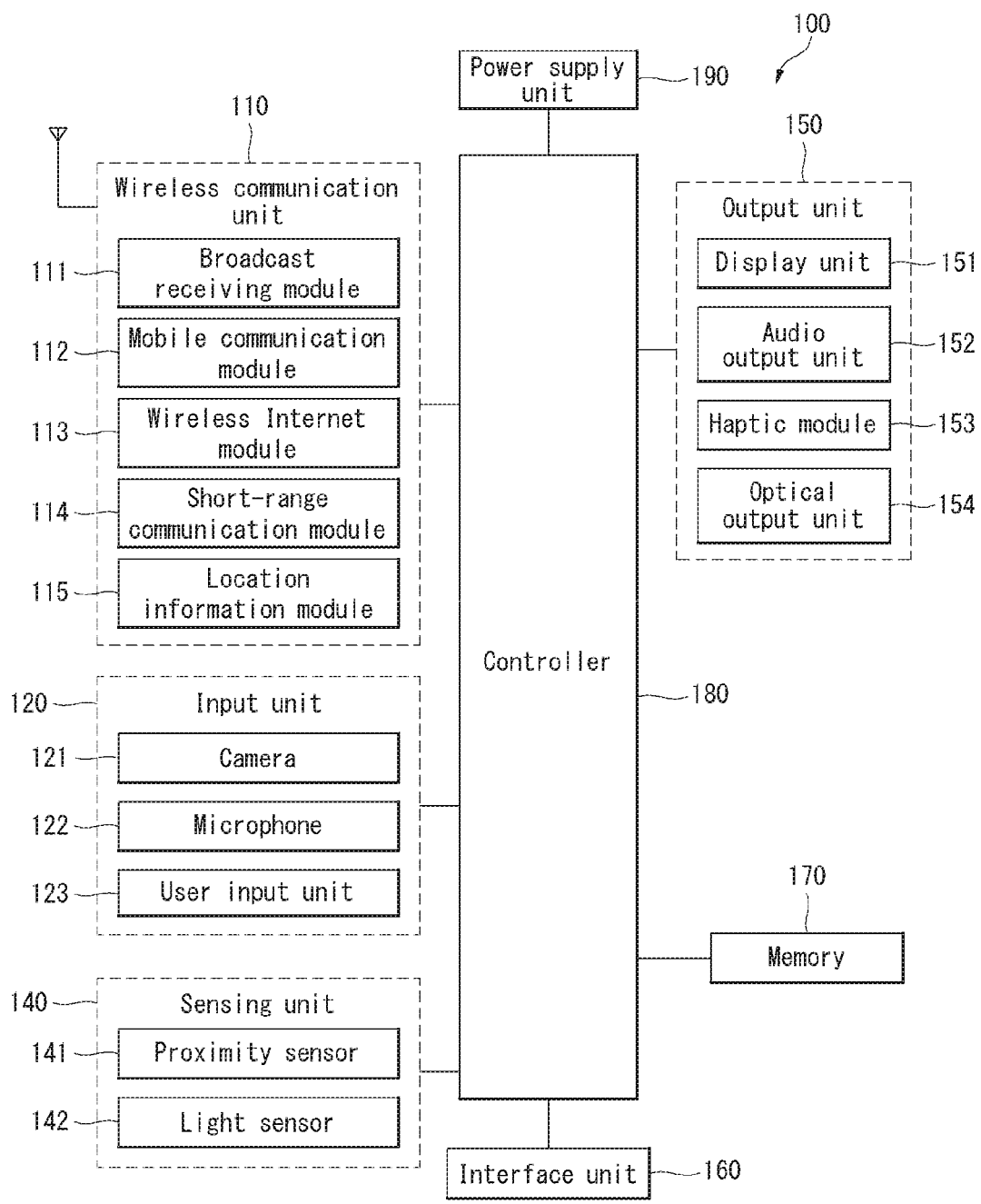
FIG. 1A is a block diagram of a mobile terminal in accordance with the present disclosure.

FIG. 1A is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as proximity sensor (141), illumination sensor (142), a touch sensor, an acceleration sensor (144), a magnetic sensor, a G-sensor, a gyroscope sensor (143), a motion sensor, an RGB sensor, an infrared (IR) sensor, a force sensor (145), a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100.

The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data.

Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 1B:
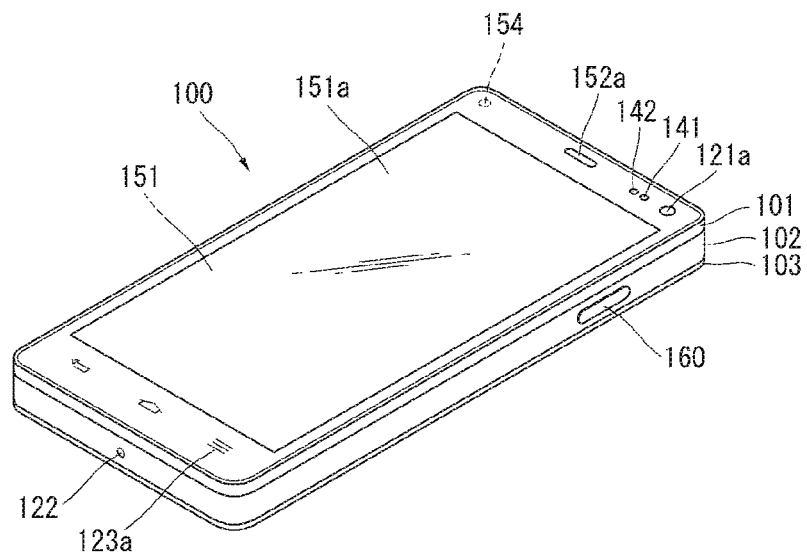
FIGS. 1B and 1C are conceptual views of one example of the mobile terminal, viewed from different directions.
Figure 1C:
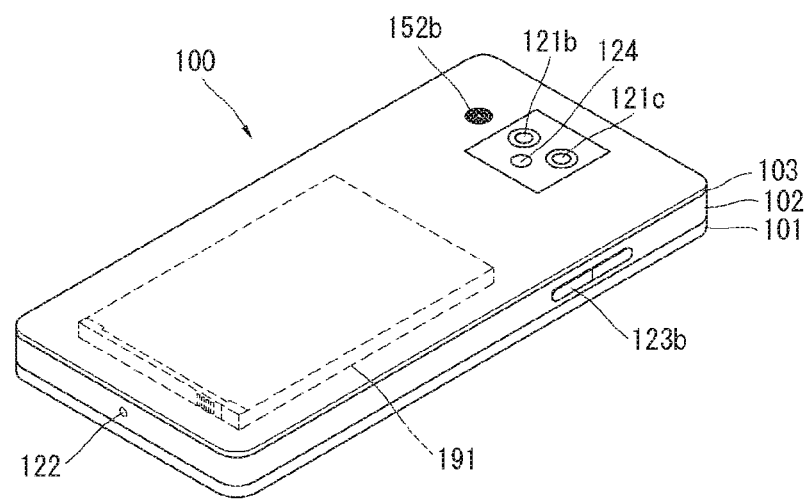

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101).

In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure.

The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2A:
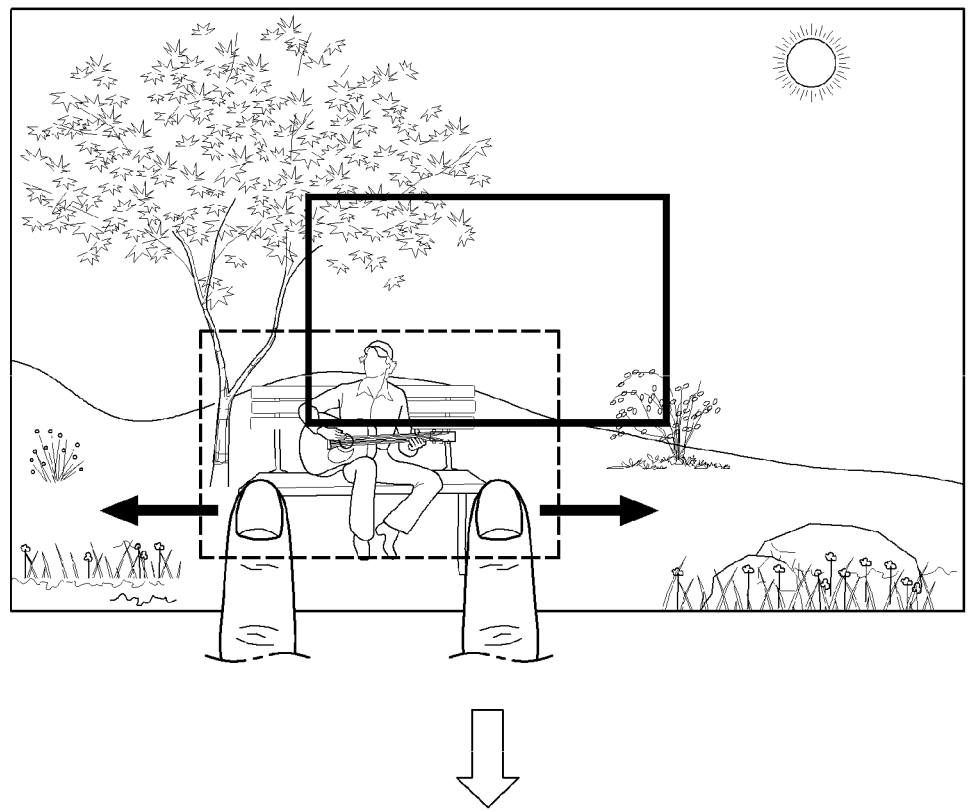
FIGS. 2A, 2B, illustrate an example in which zoom processing of an arbitrary area of a preview is performed.
Figure 2A:
Figure 2B:
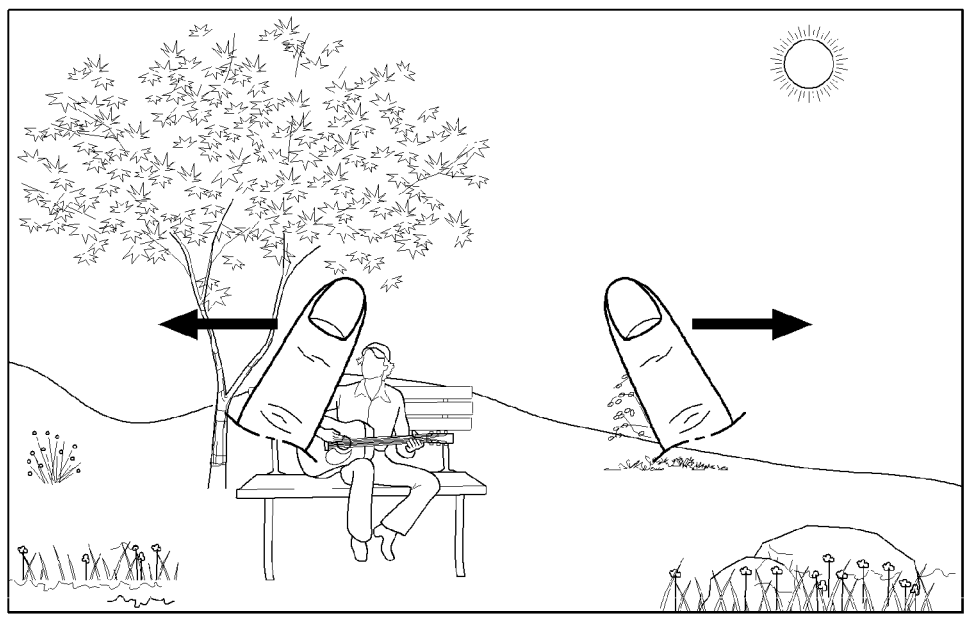
Figure 2B:
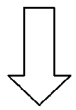
Figure 2B:
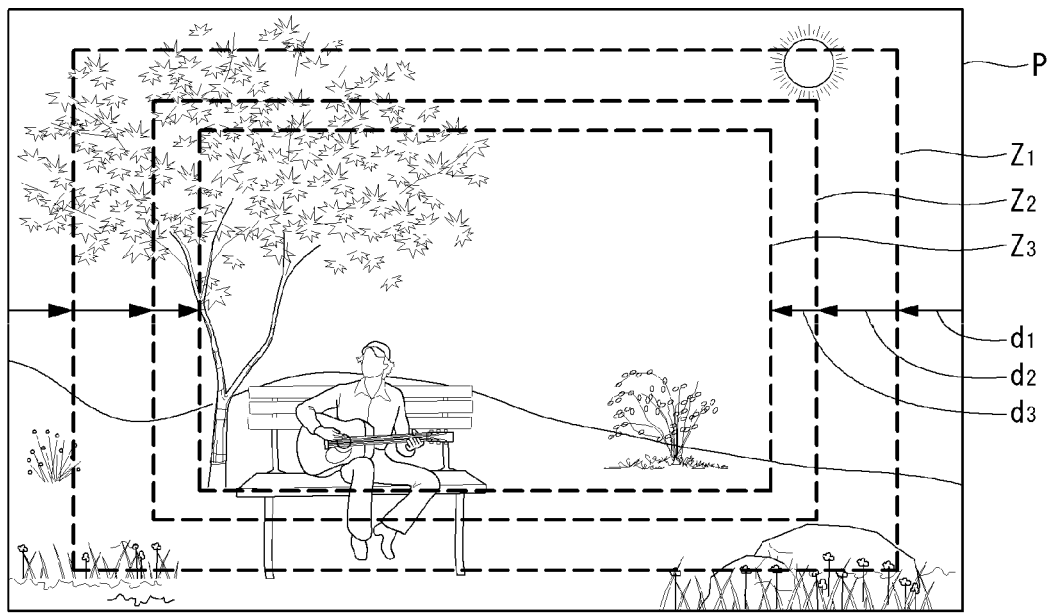

FIGS. 2A, 2B illustrate an example in which zoom processing of an arbitrary area of a preview is performed.

Referring to FIG. 2A, when an input for enlarging an arbitrary area (for example, a pinch zoom input) is received while a camera of a mobile terminal captures an image in a conventional situation (in which a preview image is displayed or a video is being shot), a zoom processing is performed with respect to the central point of the preview image rather than the arbitrary area.

In other words, for most cases, zoom processing is performed with respect to the center of a preview image independently of a touch point at which a multi-touch input is received rather than an area desired by the user with respect to the touch point.

Also, referring to FIG. 2B, in the case of a zoom input from a multi-touch input, a zoom operation may be performed through a drag input of the user's finger. In this case, a zoom factor may be determined according to a moving speed of the user's finger, and quality of a zoom image may deteriorate due to unsteady hand motion. In other words, when a pinch zoom input corresponding to a first distance d1 is received while a preview image P is displayed, a zoom image Z1 enlarged as much as the first distance d1 may be displayed; afterwards, when a pinch zoom input corresponding to a second distance d2 longer than the first distance d1 is received, a zoom image Z2 enlarged as much as the second distance d2 may be displayed. Subsequently, when a pinch zoom input corresponding to a third distance d3 shorter than the first and the second distance is received again, a zoom image Z3 enlarged as much as the third distance d3 may be displayed. In other words, while the preview image P is displayed, zoom processing may be performed at a non-uniform speed depending on the speed of a drag input for enlarging an image.

To solve the problems above, the present invention determines a criterion for performing zoom processing on the basis of a touch point and processes a zoom processing speed in a uniform manner, thereby enabling a zoom operation to be performed in a more natural manner.

Figure 3:
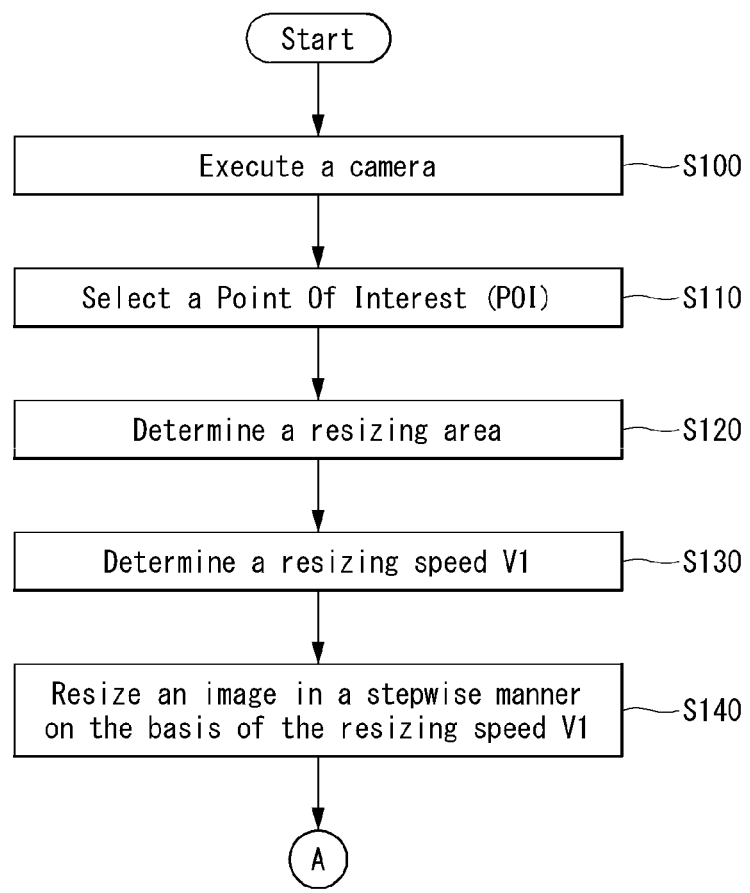
FIG. 3 is a flow diagram of a method for controlling an electronic device according to one embodiment of the present invention.

FIG. 3 is a flow diagram of a method for controlling an electronic device according to one embodiment of the present invention.

A method for controlling an electronic device according to one embodiment of the present invention may be implemented in an electronic device described with reference to FIGS. 1A to 1C and FIGS. 6 to 7 to be described later. In what follows, with reference to related drawings, a method for controlling an electronic device according to one embodiment of the present invention and the operation of an electronic device 100 to implement the method will be described in detail.

Referring to FIG. 3, the controller 180 of an electronic device 100 may activate a camera S100 and display a preview image obtained through the camera on the display 151.

When a predetermined input is received, the controller 180 may select a Point Of Interest (POI) in the preview image desired to be zoomed S110.

The POI may correspond to part of the whole preview image. The POI may be a predetermined object in the whole preview image area. Also, the POI may be an area which includes the predetermined object in the whole preview image area.

Meanwhile, the predetermined object may include a moving object, and the controller 180 may change the position of the POI by tracking the moving object continuously.

The predetermined input may be a long touch input or a double tab input in addition to an area to be designated. When the long touch input (including the double tab input) is received, the controller 180 may set an area within a predetermined radius from a touch point as the POI. The area within a predetermined radius may be an area of rectangular shape around the touch point. Meanwhile, when the long touch input (including a double tab input) is received, the controller 180 may recognize an object located at the touch point and set the object itself as the POI.

And for the convenience of description, the mode in which a camera captures an image according to one embodiment of the present invention is called a zoom mode.

When the camera 180 activates a camera and enters the zoom mode, the controller 180 may display a guide helping select the POI (for example, a window of a rectangular shape) on a preview image. When the controller 180 receives a touch input at a particular point (including a long touch input or double tab input) while the guide is being displayed, the controller 180 may display the guide by moving the guide to the touch point at which the touch input has been received.

When the POI is selected in the zoom mode, the controller 180 may determine a resizing area S120.

When the zoom operation is always performed around the central area of the preview image, it is not necessary to separately calculate a resizing area. However, as in one embodiment of the present invention, if the POI is selected with respect to a touch point, it is necessary to detect a resizing area.

At this time, the resizing area may refer to an area excluding the POI from the whole preview image. In other words, while excluding the resizing area from the display 151, the controller 180 may enlarge the POI to be displayed over the whole screen of the display 151.

During this process, the controller 180 may determine the initial resizing speed V1 depending on the size of the resizing area S130.

At this time, the initial resizing speed V1 may refer to the time needed until the POI is finally enlarged. For example, when the resizing area exceeds a predetermined number of pixels, a large amount of process for resizing may have to be done. Therefore, even if resizing is performed at the same speed, when the resizing area is large, it inevitably takes considerable time until the resizing area is finally zoom-processed. Therefore, the controller 180 may determine the resizing speed V1 in terms of the distance from one point of the POI to the farthest point of the whole preview image.

The controller 180 may perform resizing of an image in a stepwise manner on the basis of the determined resizing speed V1, S140 and display a zoom image generated from the resizing process on the display 151.

Figure 4:
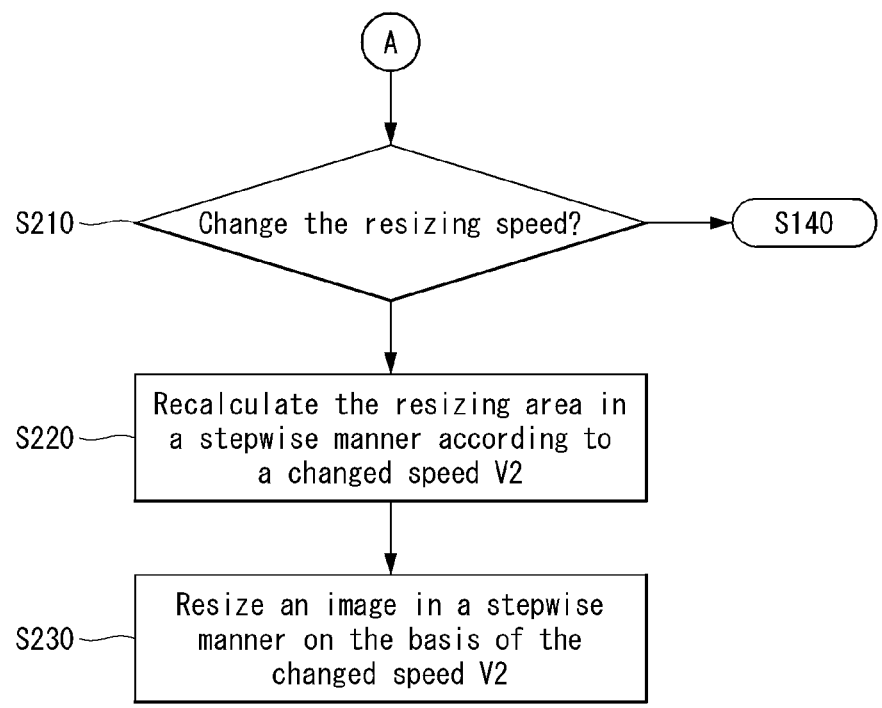
FIG. 4 is a flow diagram of a method for controlling an electronic device according to another embodiment of the present invention.

FIG. 4 is a flow diagram of a method for controlling an electronic device according to another embodiment of the present invention.

Referring to FIG. 4, while resizing an image in a stepwise manner according to a resizing speed V1 determined at the initial stage, the controller 180 may receive an input changing the resizing speed S210.

For example, when a pinch-out input (or pinch-in input) is received while a selected POI is zoom-processed at the initial resizing speed V1, the controller 180 may change the speed of zoom operation to be faster or slower.

When the controller 180 detects change of the initial resizing speed V1, S210: YES, the controller 180 may recalculate an area to be resized according to the changed speed V2, S220.

In other words, when the resizing speed is changed while the zoom-processing operation is performed at the initial resizing speed V1, the remaining resizing area is recalculated except for the area resized up to that time. Afterwards, the controller 180 performs a zoom-processing operation on the POI at a changed resizing speed V2 with respect to the recalculated resizing area S230.

Figure 5:
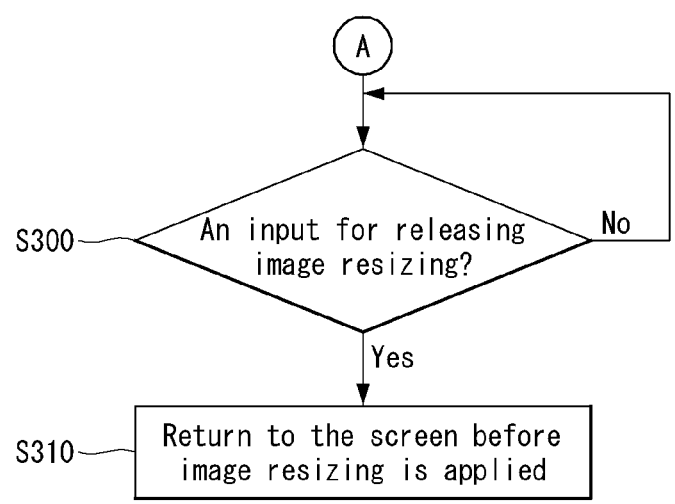
FIG. 5 is a flow diagram of a method for controlling an electronic device according to a yet another embodiment of the present invention.

FIG. 5 is a flow diagram of a method for controlling an electronic device according to a yet another embodiment of the present invention.

Referring to FIG. 5, while performing resizing of a POI, the controller 180 may receive an input for releasing image resizing. In other words, while the POI is zoom-processed, the display 151 may return to the original image.

When receiving an input for releasing image resizing S300: YES, the controller 180 may return to the screen before image resizing is applied S310.

Here, an input for releasing image resizing may refer to displaying the initial preview image before zoom-processing on the display 151 when a predetermined touch input (for example, a flicking input applied along a predetermined direction) is received while a zoom-processing operation is performed with respect to a POI on the display 151.

Up to this point, a process of resizing an image according to one embodiment of the present invention has been described with reference to FIGS. 3 to 5. In what follows, a more specific block diagram for performing image resizing according to one embodiment of the present invention will be described with reference to FIGS. 6 to 7.

Figure 6:
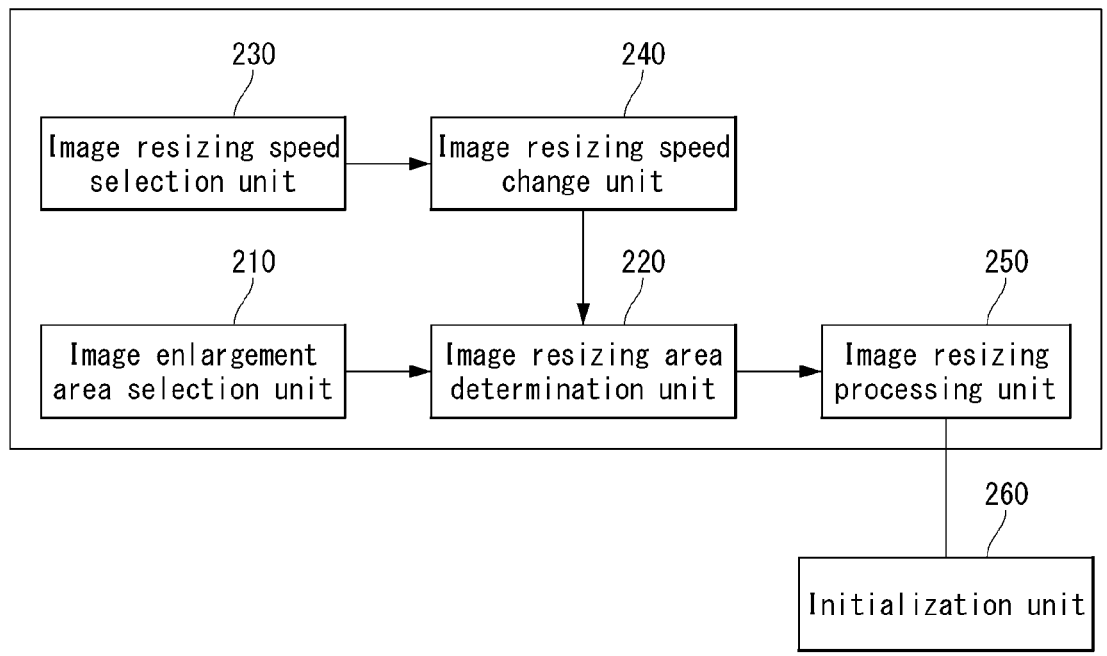
FIGS. 6 to 7 illustrate in detail a block diagram for performing image resizing in an electronic device according to one embodiment of the present invention.
Figure 7:
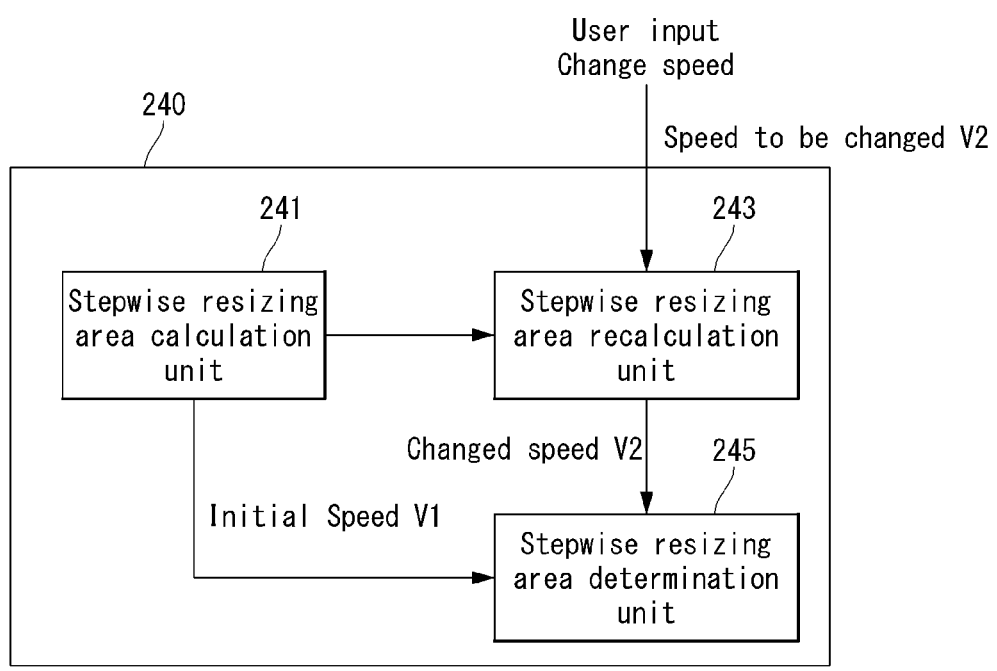

FIGS. 6 to 7 illustrate in detail a block diagram for performing image resizing in an electronic device according to one embodiment of the present invention.

FIG. 6 is an example of a block diagram for performing image resizing according to one embodiment of the present invention.

Referring to FIG. 6, a process of image resizing according to one embodiment of the present invention may be performed by the controller 180, where the controller 180 may be divided into a plurality of function blocks to perform the image resizing operation. The controller 180 may include an image enlargement area selection unit 210, image resizing speed selection unit 230, image resizing speed change unit 240, image resizing area determination unit 220, image resizing processing unit 250, and initialization unit 260.

The image enlargement area selection unit 210 may select at least one area from the preview image displayed on the display 151. When a touch input is received at a particular point on the preview image, the image enlargement area selection unit 210 may select an area within a predetermined radius from the touch point as an image enlargement area (POI). The image enlargement area selection unit 210 may determine the position and the size of a target area according to a touch input of the user.

The image resizing area determination unit 220 determines the whole preview image excluding a selected image enlargement area as a resizing area.

The image resizing speed selection unit 230 performs a function of selecting a speed at which a resizing area is zoom-processed. The image resizing speed selection unit 230 may select a predetermined speed, or the resizing speed may be selected automatically by taking into account the position and/or size of image resizing. The image resizing speed selection unit 230 may determine the resizing speed selectively according to the attribute of the resizing area. For example, when the motion of an object belonging to the resizing area is fast (such as a decisive moment of a sports game or a performance scene), an instantaneously fast zoom speed is required; the image resizing speed selection unit 230 may selectively control the zoom speed according to the attribute of a resizing area.

As described above, when it is determined that an instantaneous zoom speed change is needed according to the attribute of a resizing area, the image resizing speed change unit 240 may control the image resizing speed selection unit 230 to change the zoom processing speed. Also, the image resizing speed change unit 240 may also be controlled to change the resizing speed through the user input during zoom processing.

When the resizing area and resizing speed are determined, the image resizing processing unit 250 performs the resizing operation on a resizing area in a stepwise manner according to the resizing speed S250.

Here, the resizing operation may indicate an operation of enlarging or decreasing a resizing area (POI).

The initialization unit 260 initializes resizing values set through the image enlargement area selection unit 210, image resizing area determination unit 220, image resizing speed selection unit 230, and image resizing speed change unit 240 so that a preview image before zoom processing is performed may be displayed on the display 151.

In what follows, the image resizing area determination unit 220 will be described in more detail.

FIG. 7 is a block diagram illustrating the image resizing area determination unit of FIG. 6 in more detail.

Referring to FIG. 7, the image resizing area determination unit 220 may include a stepwise resizing area calculation unit 241, stepwise resizing area recalculation unit 243, and stepwise resizing area determination unit 245.

The stepwise resizing area calculation unit 241 calculates how many times to apply the resizing process performed discontinuously during zoom-processing of a resizing area at the initial resizing speed V1. For example, zoom-processing may be performed multiple times while a POI on a preview image is zoom-processed to the size of the preview image; the number of zoom-processing may be calculated depending on the size of a resizing area and the initial resizing speed. The zoom-processing may be performed more smoothly as the number of zoom-processing application is increased.

The stepwise resizing area recalculation unit 243 recalculates the resizing area in a stepwise manner when a resizing speed V2 is set differently from the initial resizing speed V1. In other words, when the resizing speed is changed through the user input while zoom-processing is performed at the initial speed V1, the stepwise resizing area recalculation unit 243 has to recalculate the area to be zoom-processed at the changed speed V2.

For example, the area reduced by zoom-processing according to the change of a resizing speed may be calculated by (area to be reduced at a resizing speed before it is changed)*(speed after change−speed before change).

If an area to be zoom-processed is recalculated, the stepwise resizing area determination unit 245 performs the resizing operation in a stepwise manner as many times as the number of zoom-processing determined according to the changed speed V2.

Up to this point, a function block which processes a zooming operation according to a changed resizing speed after a resizing area is recalculated due to the change of the resizing speed has been described. However, there may be more function blocks which perform resizing according to one embodiment of the present invention, and at least one or more function blocks may be combined so that a plurality of functions may be performed in one function block.

Meanwhile, according to one embodiment of the present invention, as the size or position of a resizing area is changed, the resizing speed may also be changed. A zoom-processing according to one embodiment of the present invention according to the change of a resizing speed will be described in more detail with reference to FIGS. 12, 16A, and 16B.

Figure 8A:
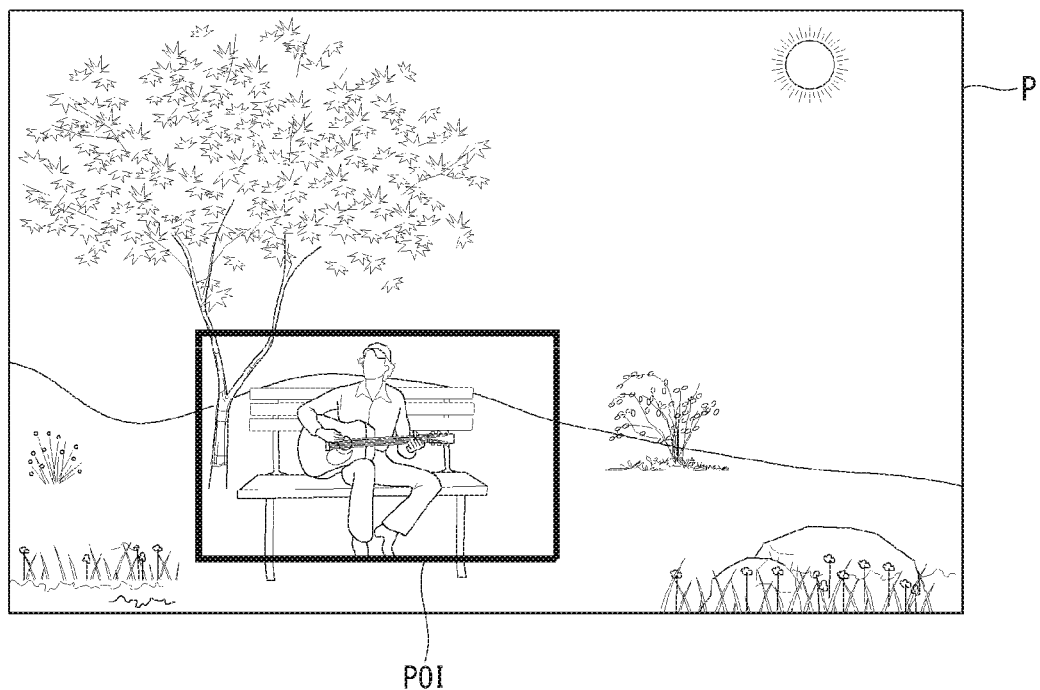
FIGS. 8A, 8B, 8C, 8D illustrate an example in which zoom processing of an arbitrary area of a preview image is performed according to one embodiment of the present invention.
Figure 8B:
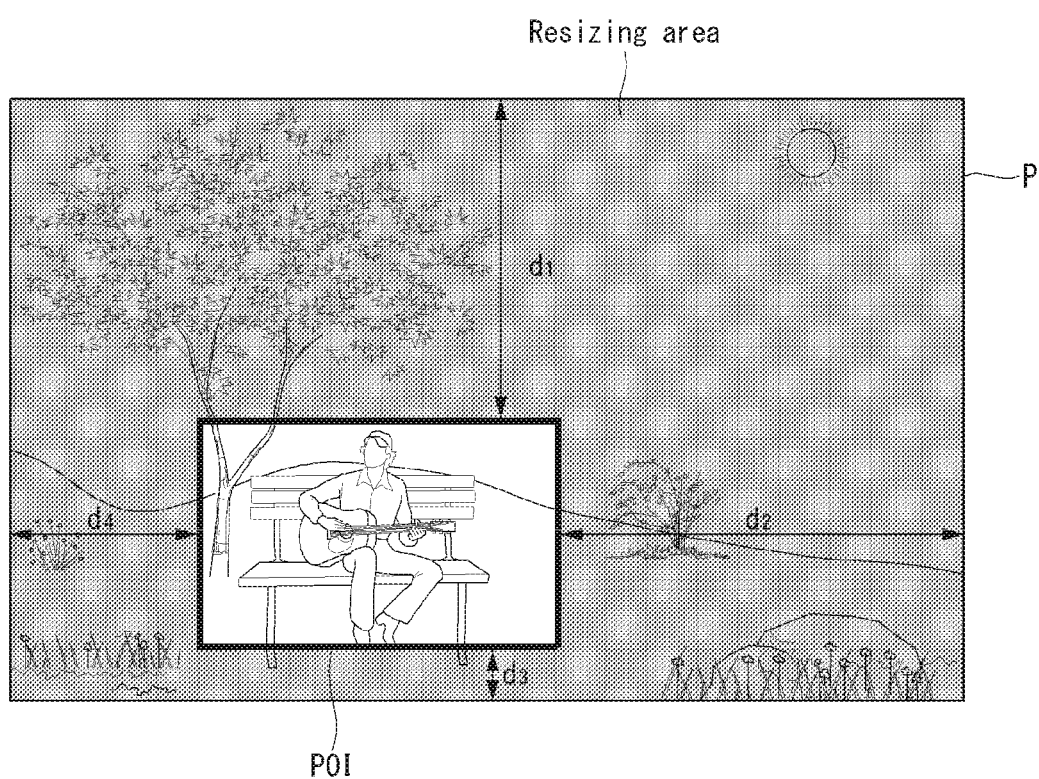

FIGS. 8A, 8B illustrate an example in which zoom processing of an arbitrary area of a preview image is performed according to one embodiment of the present invention.

Referring to FIG. 8A, the controller 180 may select a POI to be enlarged while a preview image or a video is shot. A process for selecting the POI is the same as described with reference to FIG. 3. The POI may be an area which includes an area within a predetermined radius from a touch point.

Referring to FIG. 8B, when a POI is selected, the controller 180 may determine a resizing area. The resizing area corresponds to the whole preview image area except for the POI. By performing a resizing operation on the resizing area, the controller 180 may control the POI to be enlarged up to the size of the original preview image.

The resizing area may be determined in a non-uniform manner depending on the position of the POI. In other words, the POI may be determined around the center of a preview image, and if both of the preview image and the POI are square-shaped, the distance from one edge of the preview image to one edge of the POI facing the one edge of the preview image may be kept to be uniform. However, in one embodiment of the present invention, the POI may be positioned in an arbitrary area on the preview image, and the POI may also form a shape completely different from that of the preview image. Therefore, in a resizing area determined according to one embodiment of the present invention, the distance d1 from a first edge of a preview image to a first edge of the corresponding POI may be different from the distance d2 from a second edge of the preview image to a second edge of the corresponding POI. In the same manner, referring to FIG. 8C, d1, d2, d3, and d4 may have different lengths from each other.

In what follows, referring to FIG. 8C, an operation for determining a resizing initial speed V1 with respect to a determined resizing area and zoom-processing an image in a stepwise manner according to the resizing initial speed V1 will be described in more detail.

For the convenience of description, the distance from a first edge of a preview image to a first edge of the corresponding POI is denoted as a first distance d1; the distance from a second edge of the preview image to a second edge of the corresponding POI is denoted as a second distance d2; the distance from a third edge of the preview image to a third edge of the corresponding POI is denoted as a third distance d3; and the distance from a fourth edge of the preview image to a fourth edge of the corresponding POI is denoted as a fourth distance d4.

According to one embodiment of the present invention, a desired POI is zoom-processed at the same speed independently of a user's input so that the POI may be zoom-processed as naturally as possible according to a predetermined zoom factor.

As described above, since the POI may be set to have an arbitrary size at an arbitrary position on the preview image, the first distance d1, the second distance d2, the third distance d3, and the fourth distance d4 may be different from each other.

The controller 180 calculates the area of a resizing area and calculates the number of zoom-processing applications n. The number of zoom-processing applications n may be calculated on the basis of the first distance d1 to the fourth distance d4. For example, if a resizing area corresponding to the first distance d1, which has the largest value among the first d1 to the fourth distance d4, is to be resized at the initial resizing speed V1, V1×4n=d1 and n=d1/(4V1) may be calculated. The number of zoom-processing applications n may be applied to the remaining second distance d2, third distance d3, and fourth distance d4 in the same way.

Meanwhile, since the first d1 to the fourth distance d4 have different values from each other, the number of zoom-processing applications n is the same for each distance, but the lengths reduced from a single zoom-processing application d11, d21, d31, d41 may differ from each other.

Figure 8C:
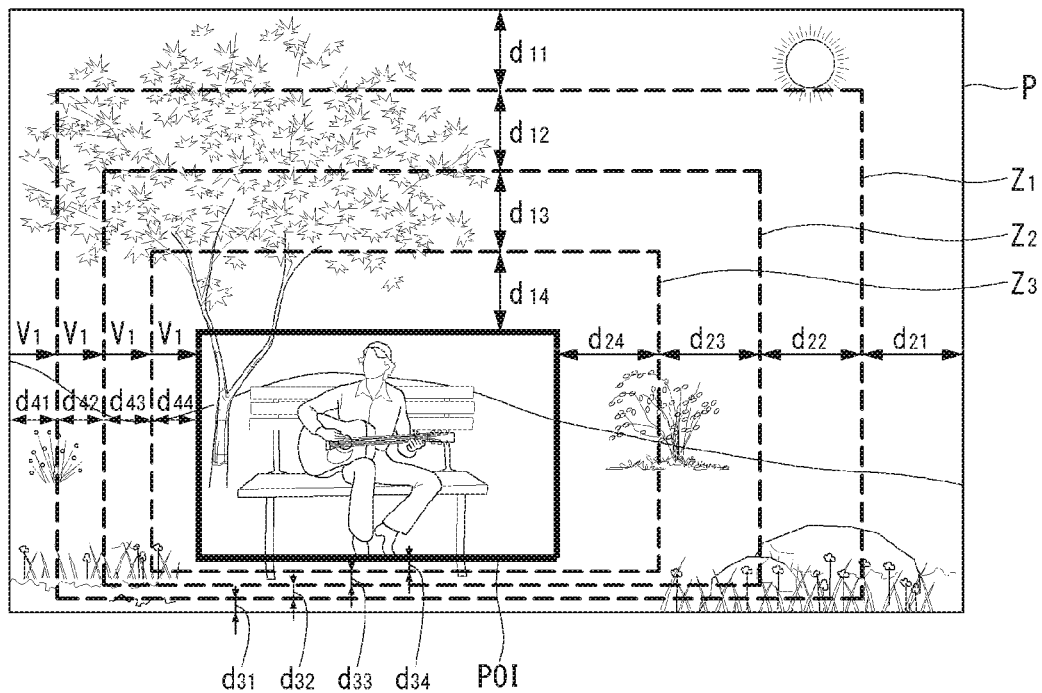

For example, suppose the number of zoom-processing applications n is 4 in the case of FIG. 8C. In this case, all of the first distance d1, the second distance d2, the third distance d3, and the fourth distance d4 represent the lengths that have to be reduced by applying zoom-processing four times. Meanwhile, since the speed V1 of each zoom-processing has to be the same while the zoom-processing is performed four times over the first distance d1, the lengths reduced from applying zoom-processing four times are the same so that d11=d12=d13=d14. In the same way, since the speed V1 of each zoom-processing has to be the same while the zoom-processing is performed four times over the second distance d2, the lengths reduced from applying zoom-processing four times are the same so that d21=d22=d23=d24. The operation above is applied in the same manner for the third d3 and the fourth distance d4.

Figure 8D:
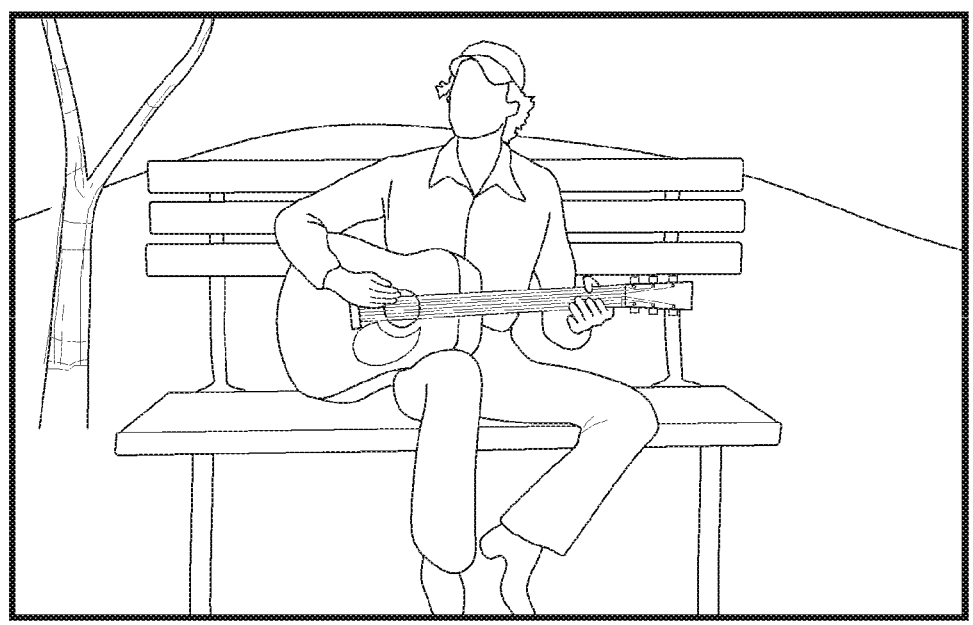

As shown in FIG. 8D, a resizing operation is performed at the same initial speed for the POI according to the algorithm described above, and the POI positioned at an arbitrary area on the preview image before the resizing operation is enlarged to cover the whole area of the preview image.

In the case of FIG. 8C, to describe the process in which a resizing area is reduced in a stepwise manner with respect to the POI, the degree of zoom-processing has been illustrated with respect to the POI displayed within the preview image. However, in fact, the POI is enlarged in a stepwise manner to a third zoom image Z3, to a second zoom image Z2, and then to a first zoom image Z1.

Figure 9:
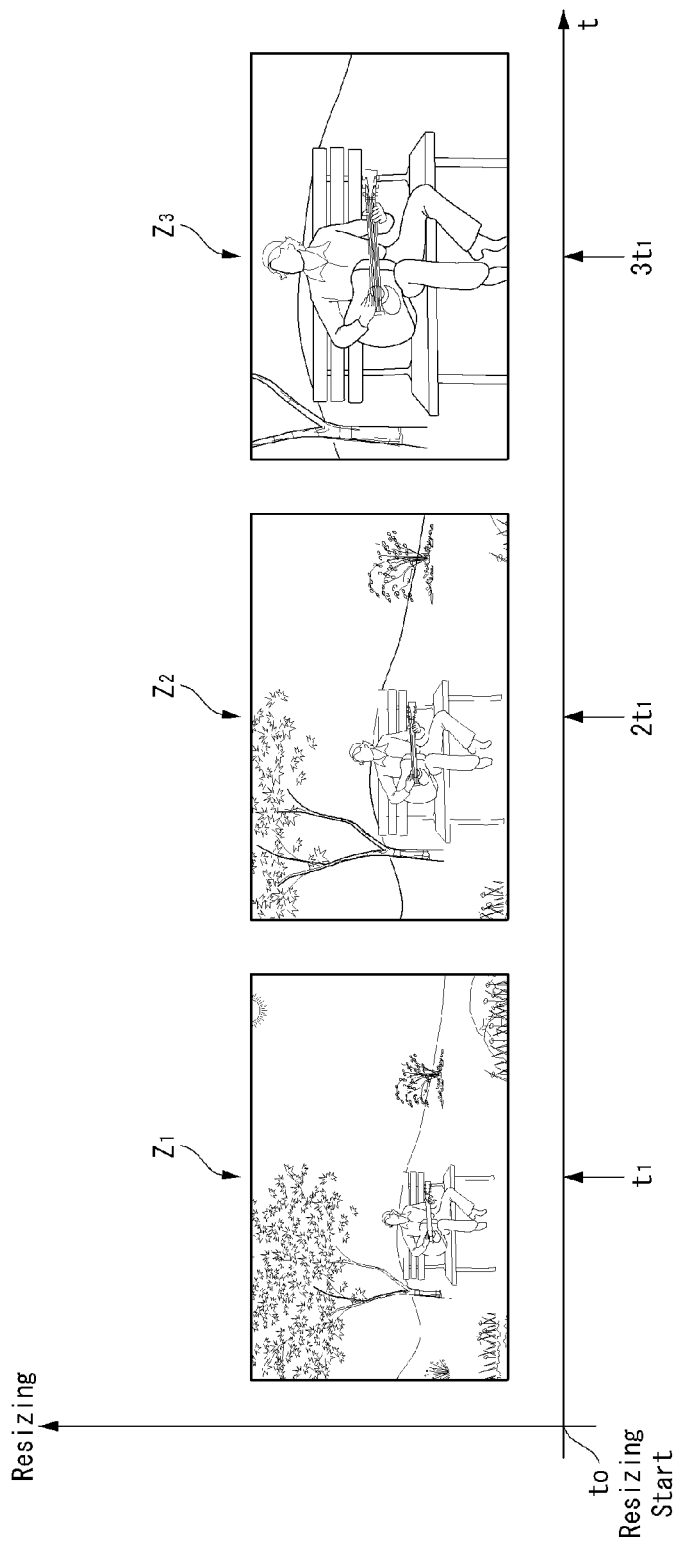
FIG. 9 illustrates in detail a process for performing a zoom operation on a resizing area at a uniform speed according to one embodiment of the present invention.

To describe the operation in more detail, FIG. 9 illustrates in detail a process for performing a zoom operation on a resizing area at a uniform speed according to one embodiment of the present invention.

Referring to FIG. 9, when a resizing area is determined, the controller 180 may start the resizing operation at a reference time t0. After t1 is passed from the reference time, a first zoom image Z1 may be displayed over the whole screen. Afterwards, after 2t1 is passed from the reference time t0, a second zoom image Z2 may be displayed over the whole screen, and after 3t1 is passed from the reference time t0, a third zoom image Z3 may be displayed over the whole screen.

Figure 10:
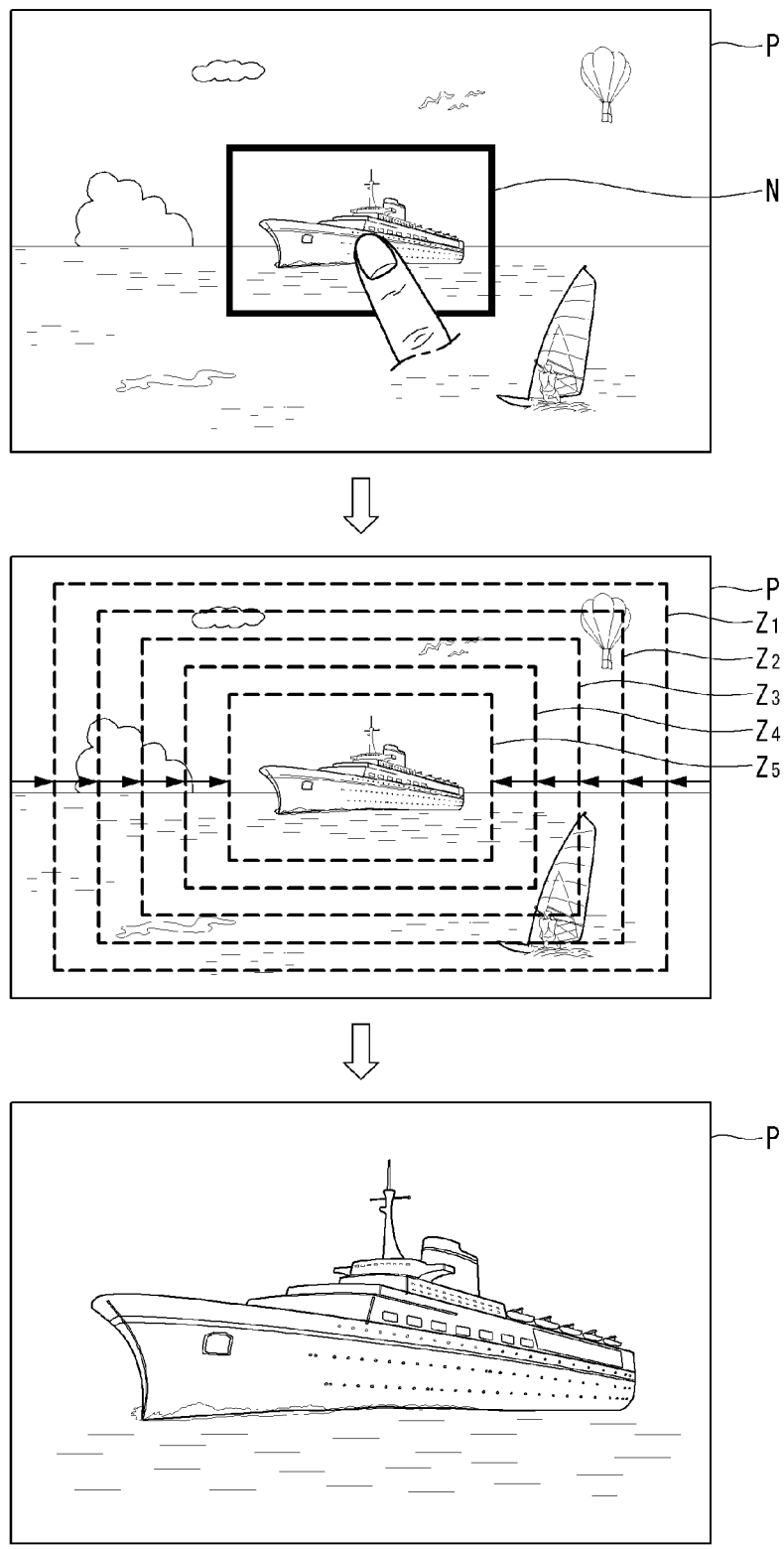
FIGS. 10 to 11 illustrate an example of selecting a POI to be zoom-processed in a stepwise manner according to one embodiment of the present invention.
Figure 11:
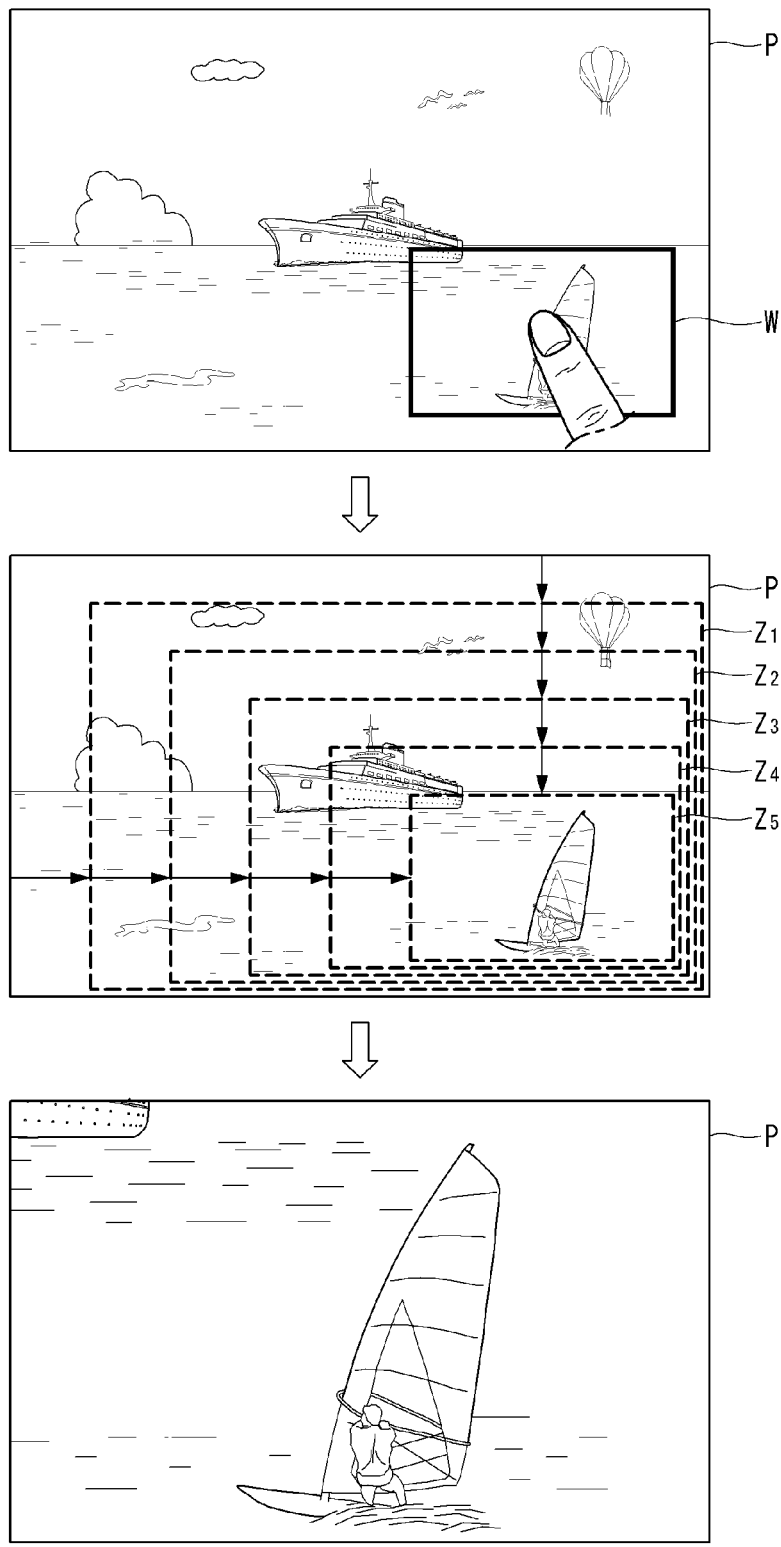

FIGS. 10 to 11 illustrate an example of selecting a POI to be zoom-processed in a stepwise manner according to one embodiment of the present invention.

Referring to FIG. 10, the controller 180 receives an input for selecting a POI from a preview image P. An input for selecting a POI may be a long touch input or a double tab input on the POI or in the vicinity thereof. The input for selecting a POI is not limited to the aforementioned examples but may be implemented in various forms.

When a long touch input is received with respect to an arbitrary area of the preview image P, the controller 180 may set a touch point or an area within a predetermined radius from the touch point as a POI and display the POI as a window.

Through the window, the position and the size of the POI may be guided. Therefore, for the whole preview image obtained through a camera, a zoom operation may be performed by a predetermined magnification factor.

After the POI is set, namely as soon as a long touch input is released, the controller 180 may perform an image magnification operation in a stepwise manner.

For example, to display the POI as a final zoom image, the controller 180 may perform zoom-processing in a stepwise manner at a constant speed to obtain a first zoom image Z1, a second zoom image Z2, a third zoom image Z3, a fourth zoom image Z4, and a fifth zoom image Z5.

In the case of FIG. 10, the selected POI is relatively in the center area of the preview image, but an arbitrary area of the preview image may be selected as the POI.

Referring to FIG. 11, a right-side lower area of the preview image P may be selected as a POI. In this case, as described above, the controller 180 may perform zoom-processing in a stepwise manner at a constant speed to obtain a first zoom image Z1, a second zoom image Z2, a third zoom image Z3, a fourth zoom image Z4, and a fifth zoom image Z5. The final fifth zoom image Z5 may be displayed in the center area of the preview image.

Figure 12:
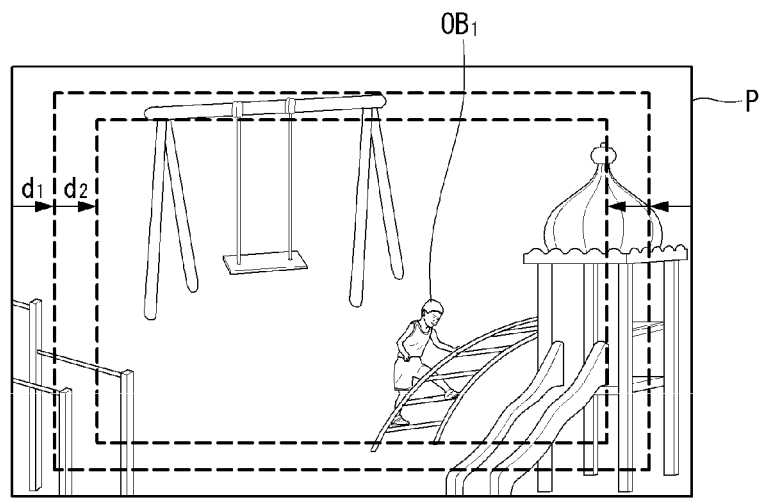
FIG. 12 illustrates an example in which a resizing speed is changed according to the motion of a moving object included in a POI according to one embodiment of the present invention.
Figure 12:
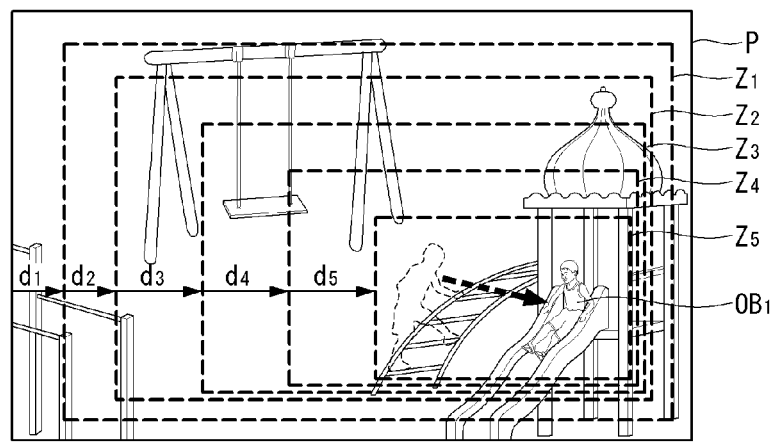
Figure 12:
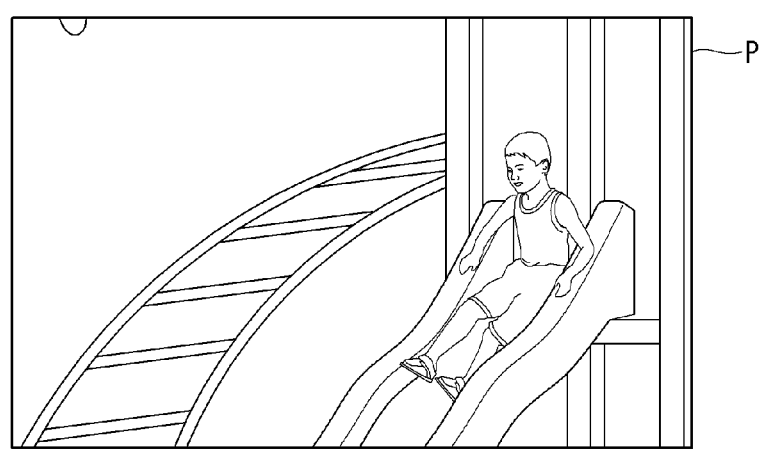

FIG. 12 illustrates an example in which a resizing speed is changed according to the motion of a moving object included in a POI according to one embodiment of the present invention.

Referring to FIG. 12, as described above, the POI may be a predetermined object OB1 or may be an area including the object. Also, the predetermined object may be a person object, which may be a moving object OB1 that may move freely. For the convenience of description, an object included in a POI will be called an object of interest.

When the object of interest is a moving object, the controller 180 may track the motion of the moving object and reflect the motion of the moving object to change the position of the POI in real-time.

For example, in FIG. 12, after an object of interest OB1 located at a first position of the preview image (for example, at the center of the preview image) is selected, the controller 180 may generate a first zoom image Z1 and a second zoom image Z2 at an initial resizing speed V1 for stepwise zoom-processing of the object of interest OB1. When motion of the object of interest OB1 is detected (for example, the object of interest OB1 moves to the right) while the second zoom image Z2 is displayed on the display 151, the controller 180 may recalculate a resizing area according to the object of interest OB1 and change the initial resizing speed on the basis of the recalculated resizing area. The controller 180 may generate a third zoom image Z3, a fourth zoom image Z4, and a fifth zoom image Z5 on the basis of the changed resizing speed and display the fifth zoom image Z5, which is a final goal, over the whole area of the display 151.

In this case, as shown in FIG. 12, d1=d2 due to the zooming operation with the initial resizing speed, and due to the zooming operation with a changed resizing speed, d3=d4=d5.

Figure 13:
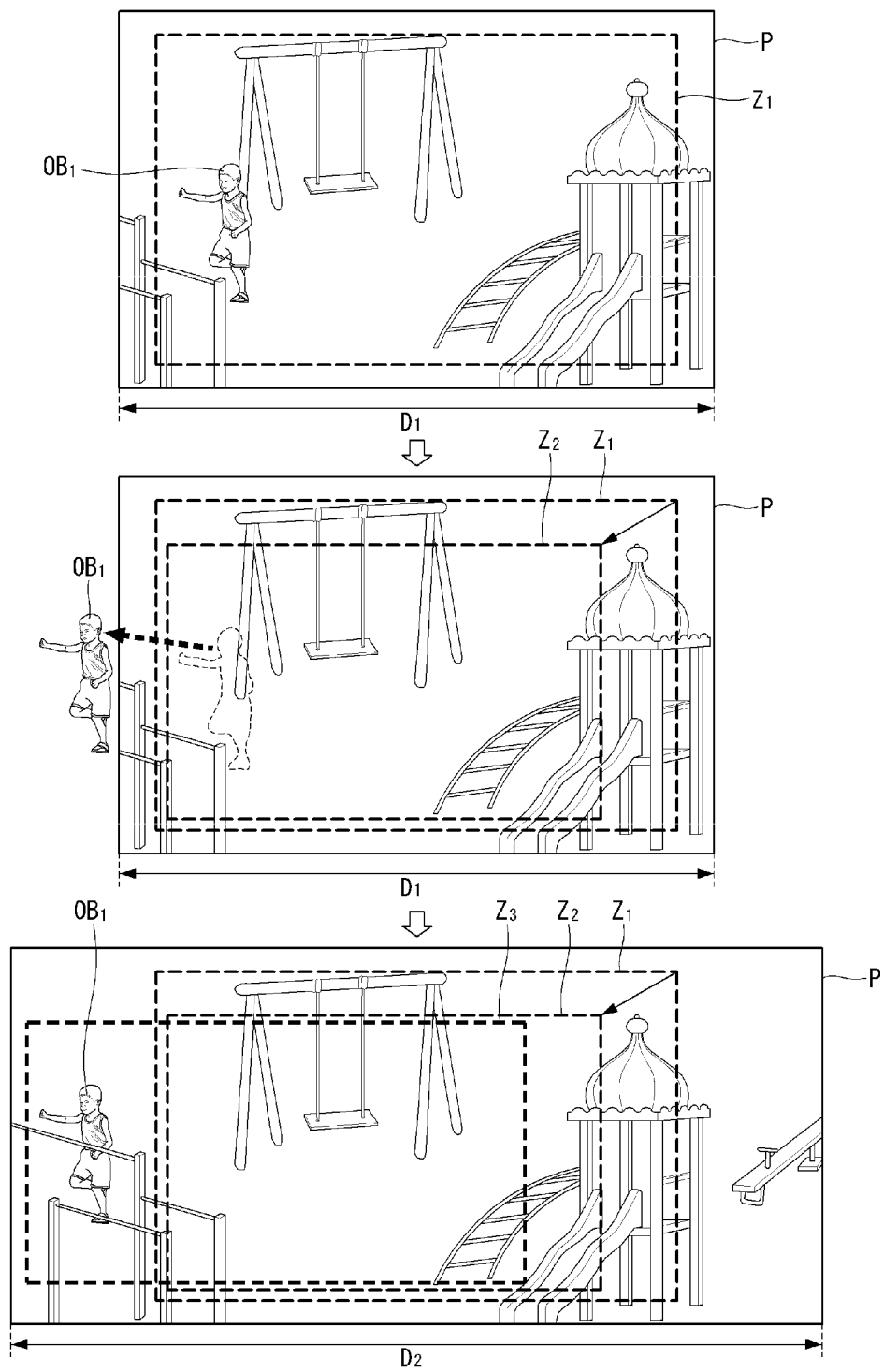
FIG. 13 illustrates an example of applying one embodiment of the present invention by using a dual camera.

FIG. 13 illustrates an example of applying one embodiment of the present invention by using a dual camera.

Meanwhile, one embodiment of the present invention may be implemented by applying a dual camera. For example, while resizing is performed through a first camera having a first field of view, resizing may be performed through a second camera having a second field of view which is larger than the first field of view. In other words, a camera which performs resizing may be automatically changed from the first camera to the second camera.

For example, referring to FIG. 13, the controller 180 may select an object of interest OB1 from a preview image P through the first camera having a first field of view. It is assumed that a longitudinal length of a preview image corresponding to the first field of view is D1. The controller 180 may perform resizing on the object of interest OB1 at a first speed and display a first zoom image Z1 on the display 151. Afterwards, the controller 180 may detect a case in which the object of interest OB1 leaves out of the first field of view due to the motion of the object of interest OB1 during a process of generating a second zoom image Z2 by additionally performing resizing at the first speed. The controller 180 may switch the camera performing resizing from the first camera to the second camera and display a preview image obtained through the second camera on the display 151. Since the second camera has the second field of view which is larger than the first field of view, the preview image may include the object of interest OB1. Accordingly, the controller 180 may recalculate a POI and a resizing area and obtain a third zoom image Z3 by performing resizing at an initial resizing speed.

Here, the second camera may be a wide-angle camera. Also, the controller 180 may combine a zoom image Z1, Z2 generated by the first camera and a zoom image Z3 generated by the second camera to form an image for which the first, the second, and the third zoom image Z1, Z2, Z3 are zoom-processed in a stepwise manner at an initial resizing speed; and store the image in the memory.

In particular, suppose a person object moving dynamically in a sports performance is set as an object of interest and the person object leaves out of the field of view of the camera. According to one embodiment of the present invention, an advantage may be obtained so that a zooming image for the person object may be constructed to be as natural as possible.

Figure 14:
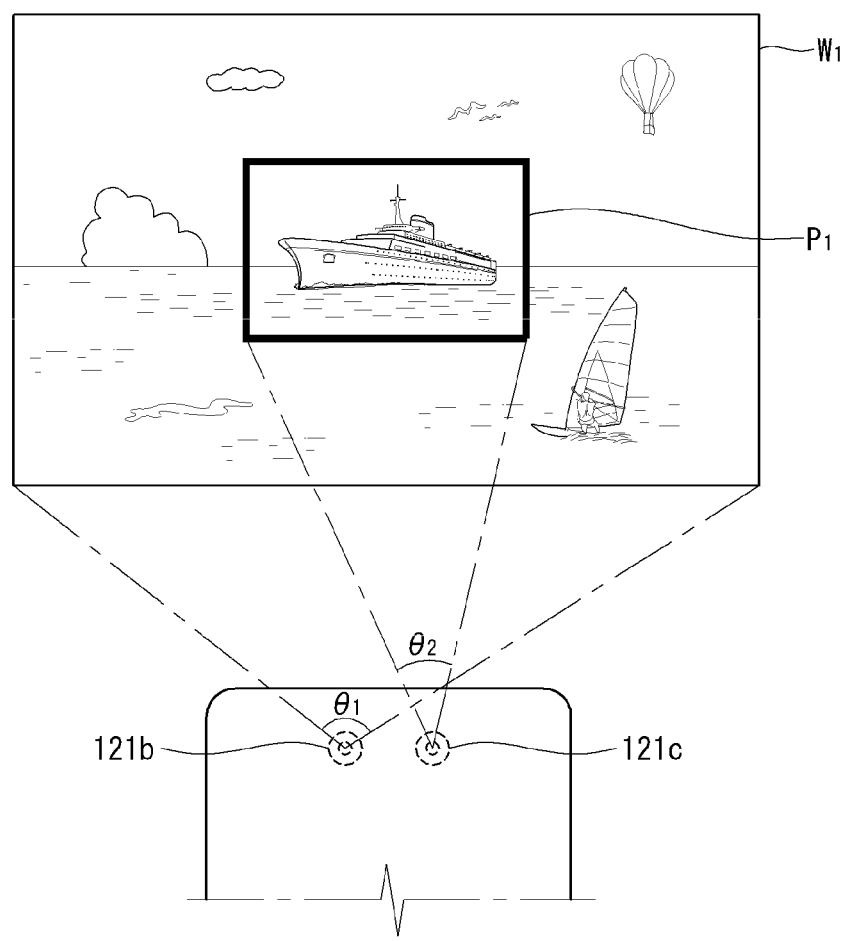
FIGS. 14, 15A, 15B, illustrate another example of applying one embodiment of the present invention by using a dual camera.
Figure 15A:
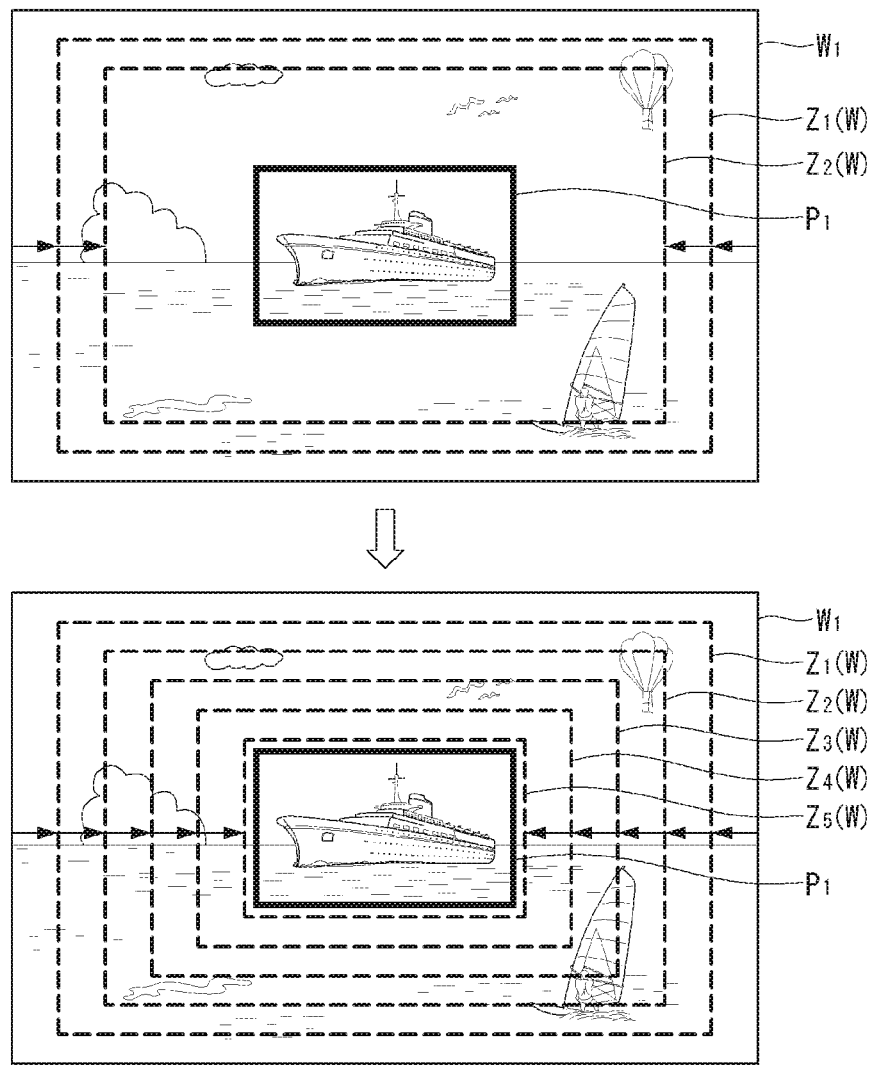
Figure 15B:
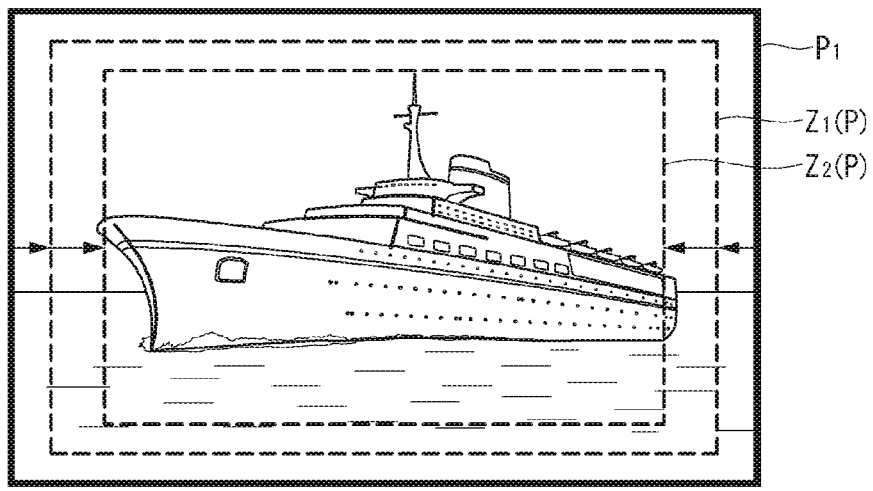

FIGS. 14, 15A, 15B illustrate another example of applying one embodiment of the present invention by using a dual camera.

Referring to FIG. 14, a first and a second camera may be applied for the image magnification operation according to one embodiment of the present invention.

The first camera 121*b* may obtain a wide-angle image including a main subject, and the second camera 121*c* may obtain a telephoto image in which the main subject is zoom-processed. The first camera 121*b* may capture the front scene with a field of view θ1 ranging from about 30° to 80°. The second camera 121*c* may generate a zoom image having a field of view θ2 narrower than that of the first camera 121*b*, for example, from 10° to 30°.

In FIG. 14, a preview image is displayed on the display through the first camera. The preview image may correspond to a wide-angle camera area W1, and the POI may correspond to the telephoto area P1.

Referring to FIG. 15A, the controller 180 may perform a resizing operation in a stepwise manner on the POI, P1, of the wide-angle camera area W1 to generate a first zoom image Z1(W) and a second zoom image Z2(W). While the POI is resized in a stepwise manner through the first camera to a third zoom image Z3(W), to a fourth zoom image Z4(W), and then to a fifth zoom image Z5(W), if the fifth zoom image Z5(W) reaches the size actually the same as the telephoto camera area P1, the controller 180 may switch the resizing camera from the first camera to the second camera. In other words, if a zoom image is made to have a size actually the same as that of the telephoto camera area while resizing is performed by a wide-angle camera, the controller 180 may automatically switch the camera performing resizing to a telephoto camera.

Referring to FIG. 15B, the controller 180 may perform a stepwise resizing operation again on the telephoto camera area P1 obtained through the second camera to obtain a first zoom image Z1(P) and a second zoom image Z2(P). As described above, when the camera performing resizing switches from a wide-angle camera to a telephoto camera, the controller 180 may recalculate the resizing area and the resizing speed and perform the resizing operation on the basis of the recalculation result.

Figure 16A:
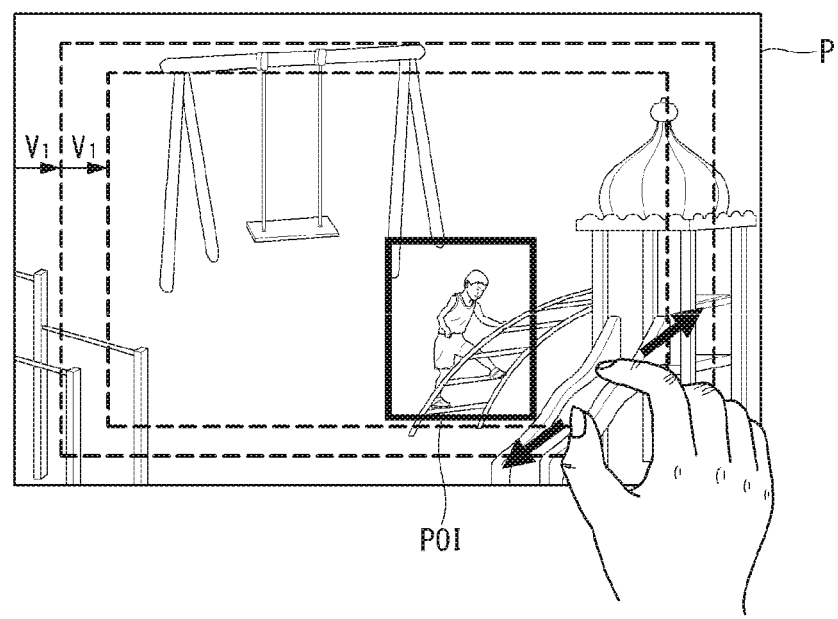
FIGS. 16A, 16B illustrate an example in which a resizing speed is changed in the middle of resizing of a POI according to one embodiment of the present invention.
Figure 16B:
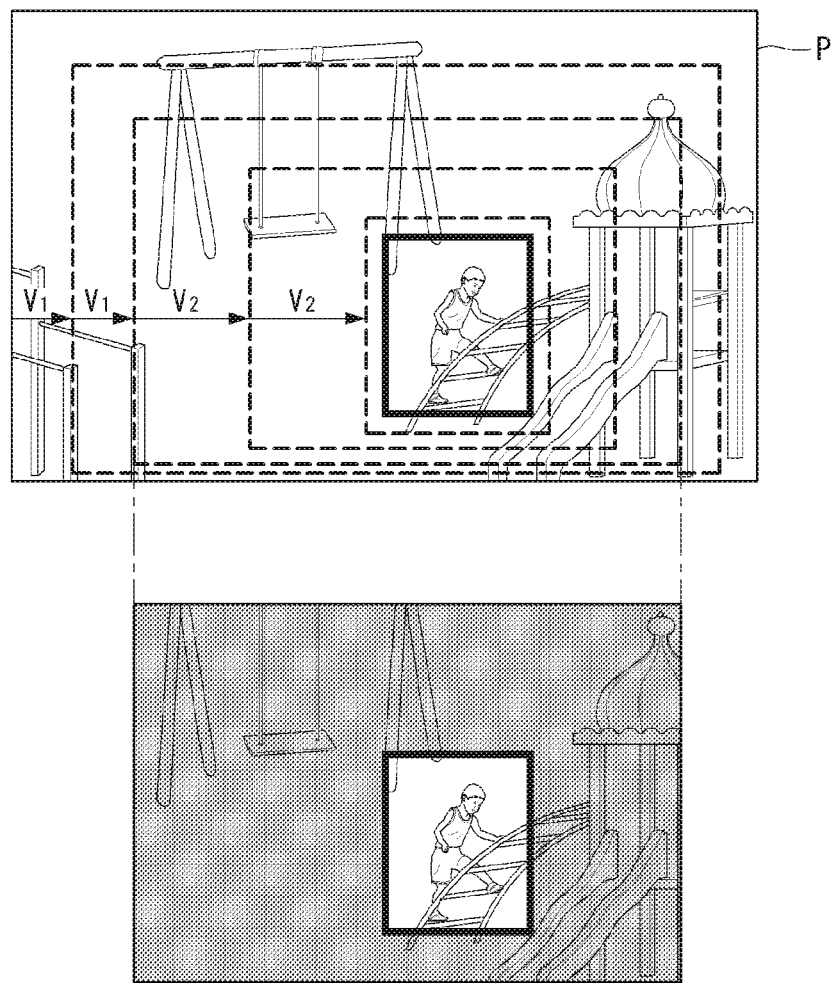

FIGS. 16A, 16B illustrate an example in which a resizing speed is changed in the middle of resizing of a POI according to one embodiment of the present invention.

Referring to FIG. 16B, when a predetermined touch input is received while resizing is performed with a first speed V1 with respect to a POI, the controller may change the resizing speed. The controller 180 may recognize the predetermined touch input as a trigger input for changing the resizing speed; an input having a specific pattern received while an image resizing operation is performed according to one embodiment of the present invention may be recognized as an input for changing the resizing speed. For example, the predetermined input may be an input having a zoom-in pattern. The controller 180 may interpret the input having a zoom-in pattern such that the user wants to have a final zoom image more quickly. Accordingly, when an input having a zoom-in pattern is received while resizing is performed at the first speed V1, the controller 180 may change the resizing speed to the second speed V2.

Meanwhile, when an input for changing the resizing speed is received, the controller 180 may recalculate the resizing area by excluding a final POI from the image before the resizing speed is changed and perform zoom-processing on the recalculated resizing area at the second resizing speed V2. Meanwhile, although the aforementioned example assumes a case in which the second resizing speed V2 is determined first, it should be noted that the present invention does not exclude the case in which the second resizing speed V2 is determined on the basis of the size of a recalculated resizing area.

Figure 17:
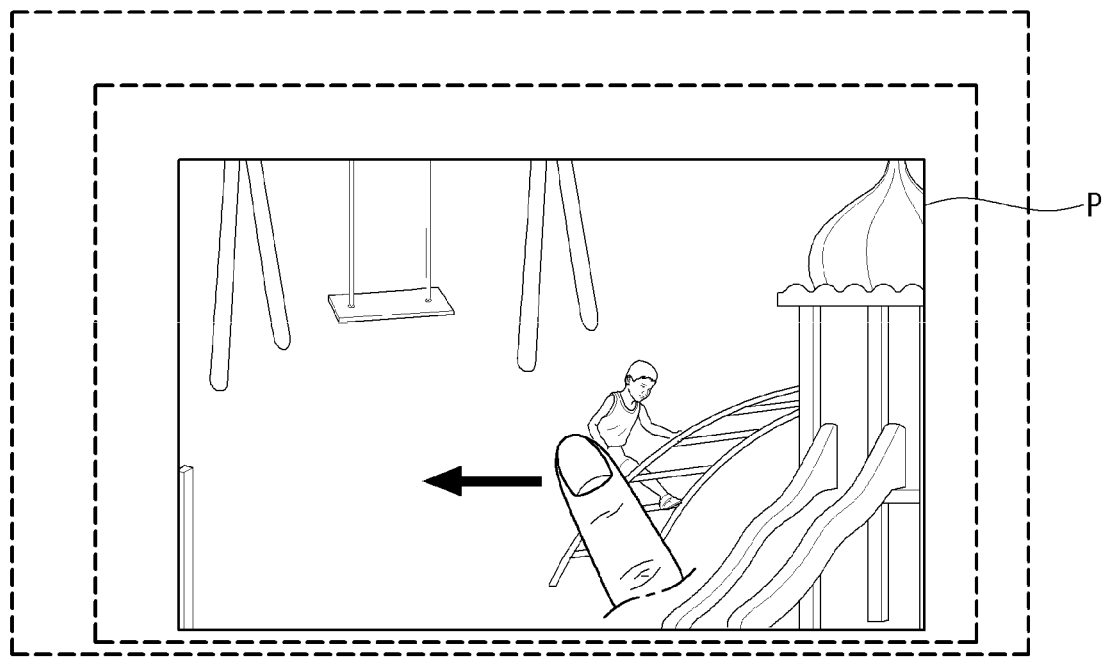
FIG. 17 illustrates an initializing process performed in the middle of resizing of a POI according to one embodiment of the present invention.
Figure 17:
Figure 17:
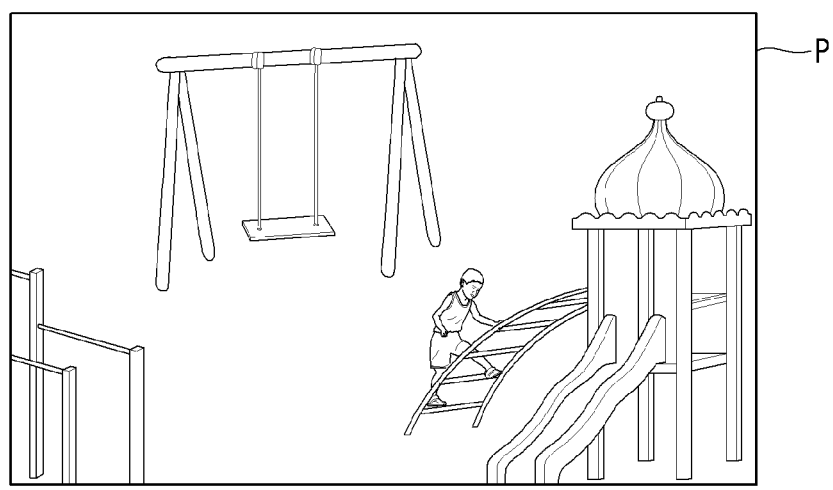

FIG. 17 illustrates an initializing process performed in the middle of resizing of a POI according to one embodiment of the present invention.

Referring to FIG. 17, when a predetermined input is received while resizing is performed on a POI in a stepwise manner, the controller 180 may restore the original preview image before a final zoom operation is completed on the POI and display the restored preview image on the display 151. Here, the predetermined input may include a flicking input along a predetermined direction, and the controller 180 may recognize the pattern input as an input for cancelling resizing.

The embodiments above have described a resizing process performed on a POI in a stepwise manner while still images are captured through a camera; however, the present invention is not limited to the embodiments above. For example, the present invention may include performing a stepwise resizing operation on a specific POI while a video is being shot through the camera. In particular, when a video is being shot through a camera, a POI and the position of a moving object belonging to the POI may change in real-time. In this case, as described above, a dual camera may be applied selectively according to the position of a POI, size change of the POI, and a moving speed of an object of interest, and so on.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. An electronic device, comprising:
a first camera;
a display: and
a controller configured to:
cause the display to display a preview image obtained from the first camera;
cause the display to display to a zoom image of the preview image when a point of interest (POI) is selected from the preview image, wherein the zoom image is obtained by resizing the POI included in the preview image in a stepwise manner according to a predetermined resizing speed and with respect to a resizing area associated with the POI, wherein the resizing speed is changed according to an input and
select the POI in response to a touch point input received at the display while the preview image is displayed, wherein the POI comprises a subject selected according to the touch point input.

2. The electronic device of claim 1, wherein the controller is further configured to:
cause the display to display a guide indicating the selected POI on the preview image.

3. The electronic device of claim 1 wherein the selected subject comprises a moving object, and wherein the controller is further configured to change position of the POI by tracking movement of the moving object.

4. The electronic device of claim 3, wherein the controller is further configured to change the resizing speed according to speed of the movement of the moving object.

5. The electronic device of claim 3, wherein the controller is further configured to recalculate the resizing area according to position of the moving object, and change the resizing speed according to the recalculated resizing area, when the movement of the moving object is detected.

6. The electronic device of claim 3, further comprising:
a wide angle camera having a field of view larger than a field of view the first camera, and wherein the controller is further configured to:
activate the wide angle camera;
obtain an image that includes the moving object from the wide angle camera when location of the moving object meets or exceeds a threshold value of a field of view of the first camera; and
cause the display to display a second preview image of the image obtained from the wide angle camera, wherein the second preview image includes the moving object that is within the POI.

7. The electronic device of claim 1, wherein the controller is further configured to:
cause the display to display the zoom image, while an image obtained from the camera is stored in memory.

8. The electronic device of claim 1, wherein area of the preview image is defined by the resizing area and the POI.

9. The electronic device of claim 8, wherein the resizing speed is determined according to a size of the resizing area.

10. The electronic device of claim 1, wherein the resizing of the POI includes enlarging or decreasing the resizing area.

11. The electronic device of claim 1, wherein the camera comprises a first camera with a wide angle of view for obtaining a main subject, and wherein the electronic device further comprises a second camera configured to obtain a telephoto image that includes the main subject.

12. The electronic device of claim 11, wherein the controller is further configured to:
cause the display to display a zoom image obtained by resizing the POI in a stepwise manner using the telephoto image obtained by the second camera, when the POI enters a field of view of the second camera and while the POI is resized through the first camera in a stepwise manner.

13. The electronic device of claim 12, wherein the controller is further configured to:
recover the preview image before a final zoom motion for the POI is completed and cause the display to display the recovered preview image, when a predetermined input is received while the POI is resized in a stepwise manner.

14. A display method performed by an electronic device having a camera and a display, the method comprising:
displaying, on the display, a preview image obtained from the camera;
zooming the preview image when a point of interest (POI) is selected from the preview image, wherein the zoomed image is obtained by resizing the POI included in the preview image in a stepwise manner according to a predetermined resizing speed and with respect to a resizing area associated with the POI, wherein the resizing speed is changed according to an input and
selecting the POI in response to a touch point input received at the display while the preview image is displayed, wherein the POI comprises a subject selected according to the touch point input.

15. An electronic device, comprising:
a camera;
a display: and
a controller configured to:
cause the display to display a preview image obtained from an image received from the camera;
zoom the preview image when a point of interest (POI) is selected from the preview image according to an input, wherein the zooming includes stepwise resizing of the POI included in the preview image according to both a resizing speed and a resizing area associated with the POI, wherein area of the preview image is defined by the resizing area and the POI; and
select the POI in response to a touch point input received at the display while the preview image is displayed, wherein the POI comprises a subject selected according to the touch point input.

* * * * *